Feb. 28, 1956     J. L. D. MORRISON     2,736,113
ADVERTISING DISPLAYS
Filed Feb. 17, 1951     2 Sheets-Sheet 1
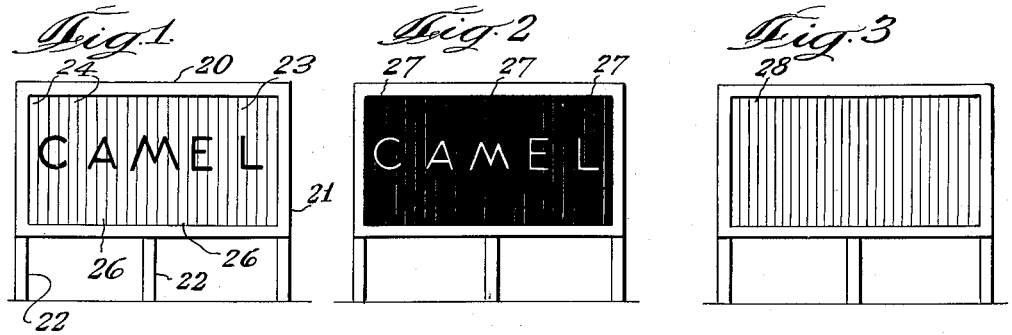
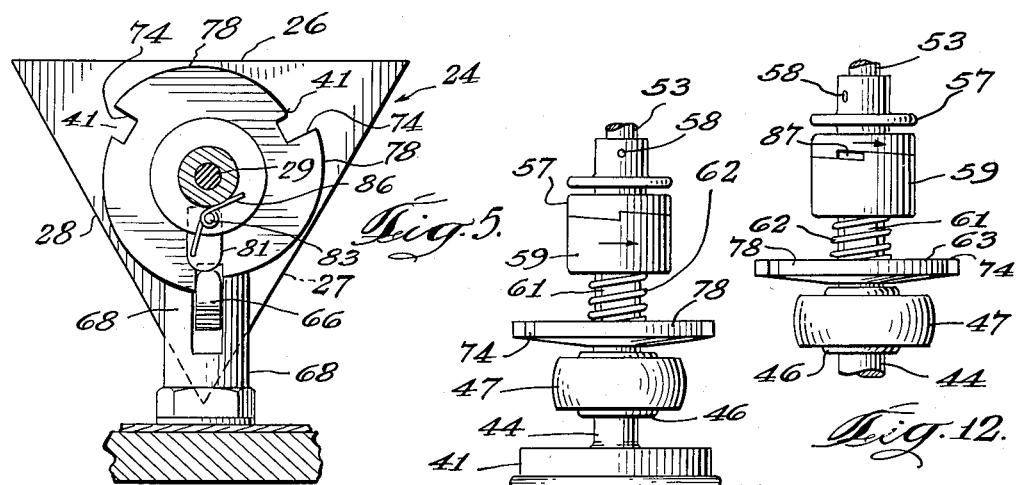
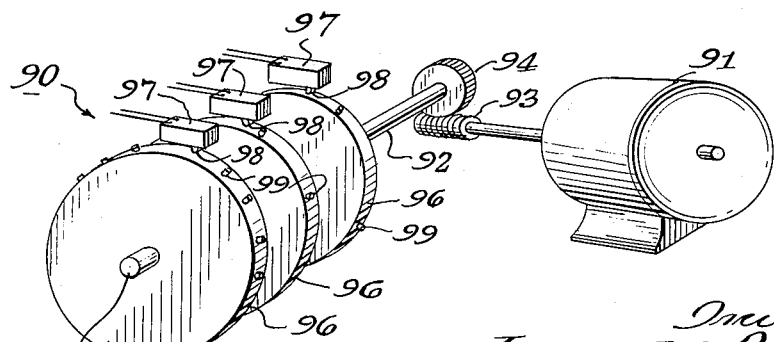
Inventor
James L. D. Morrison
By
Richard C. Lindberg
Attorney

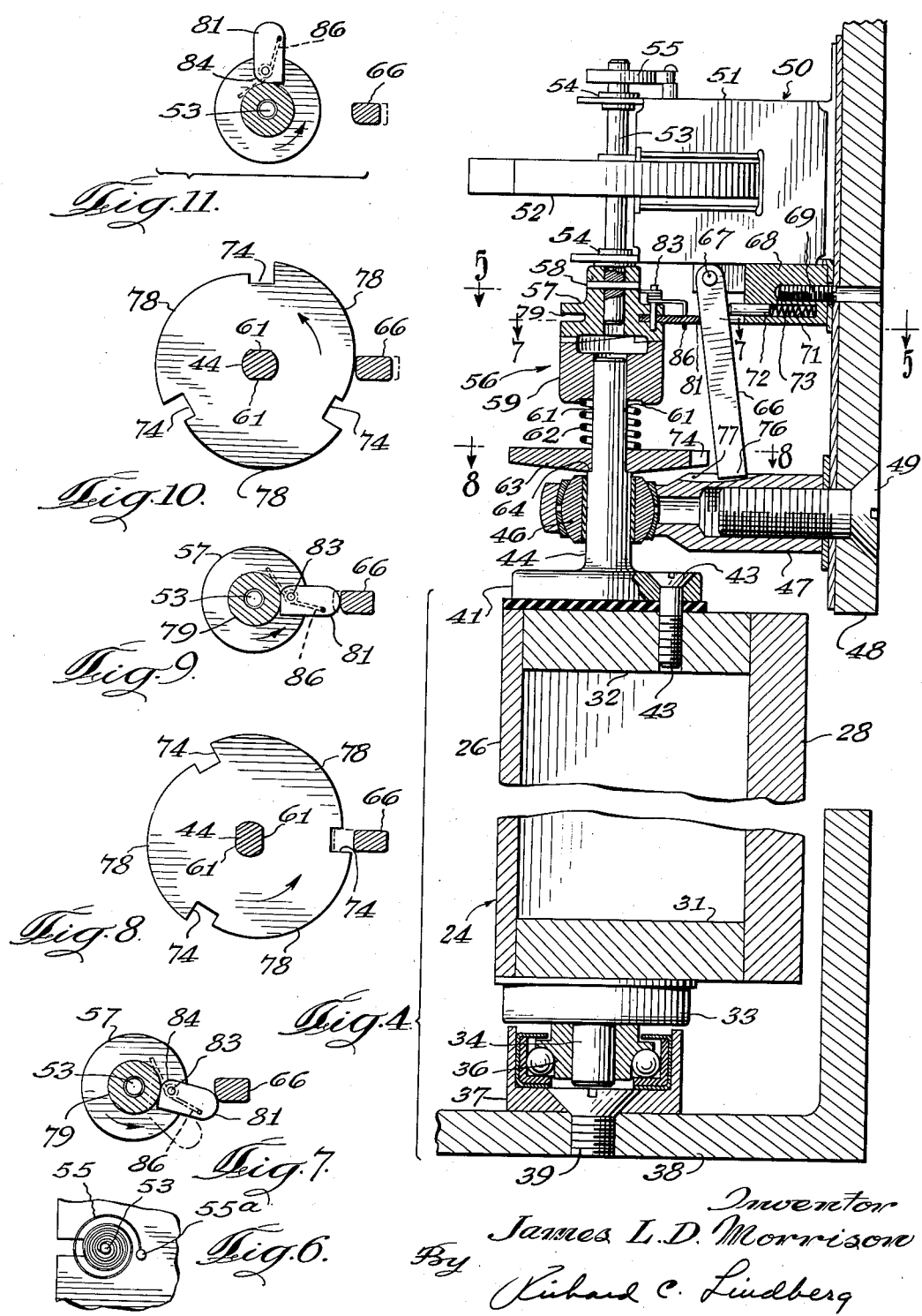

United States Patent Office 2,736,113
Patented Feb. 28, 1956

2,736,113

ADVERTISING DISPLAYS

James L. D. Morrison, Benton Harbor, Mich.

Application February 17, 1951, Serial No. 211,496

6 Claims. (Cl. 40—76)

This invention relates generally to advertising displays and more particularly to an advertising display having a changing and shifting display surface for achieving motion effects.

The present invention is characterized by being particularly adapted for use with outdoor display advertising such as a twenty-four sheet billboard. In carrying out the invention, a plurality of intelligence carrying units are arranged to turn on individual juxtaposed axes, each of the units being preferably arranged to have three surfaces with each surface lying in a plane spaced from and parallel to the turning axis of each. The transverse cross-section through each unit may thus be in the shape of an equilateral triangle, so that the units may be rotated to a position where one of the plane surfaces of each unit may lie in the extended plane of the display surface, with the apexes of each such triangular cross-section units in such plane either touching an apex of a juxtaposed unit or spaced but slightly therefrom. The extended plane composed of the juxtaposed planar surfaces is provided with suitable intelligence or sales media thereon, and each surface of the triangular cross-section shiftable unit is thus provided with a portion of suitable intelligence or sales media, so that when the several units are each rotated to a position whereby the proper juxtaposed planar surfaces lie in such extended plane, the intelligence may be varied as desired.

It is well known that display boards have heretofore been made incorporating such triangular cross-section elements, but such constructions have been capable only of producing three separate non-animated messages. In the embodiment of the invention described herein, the units may be rotated in any desired sequence to give an effect of animation, or the intelligence and the shiftable units may be so selected and operated so as to give an effect, for example, of spelling out the letters of a product being advertised. In carrying out the invention the individual shiftable units are each individually rotated by position indexing motors, and are thereafter locked in position according with one of the three surfaces lying in the extended plane. Means are provided to control the movement of each motor in accordance with an effect to be desired, and such means may be arranged so that the juxtaposed units may go through repeated cycles so that the desired motion effects may be repeated.

With the foregoing considerations in mind it is a principal object of this invention to provide a novel form of advertising board and an animation effect therefor in a manner not possible heretofore.

Another object is to afford a construction for an advertising board characterized by a plurality of juxtaposed individually rotatable units, each having an equilateral triangular cross-section affording elongated surfaces capable of being rotated to lie in an extended plane containing surfaces of the several juxtaposed units.

Still another object is to afford an animation-effect signboard characterized by a number of three-sided rotating units, the sides of the rotating elements being capable of forming different intelligence to the observer, or being capable of varying the intelligence in accordance with a selected pattern.

Other objects and important features of the invention will be apparent from a study of the following specification taken together with the drawings, which together illustrate a preferred embodiment of the invention and what is now considered to be the best mode of applying the principles thereof. Other embodiments of the invention will be apparent to those having the benefit of the teachings of the within specification, and it is intended that such other embodiments be reserved as may fall within the scope and spirit of the appended claims.

In the drawings:

Fig. 1 is a front elevation view of an outdoor advertising display board having embodied therein the improvements according to the present invention, the display board being shown, by way of example only, with the name of a product thereon in black letters on a white background;

Fig. 2 is a front elevation view similar to Fig. 1 showing the juxtaposed units rotated to a position so that the name of the product is spelled out in white letters on a red background;

Fig. 3 is a front elevation view similar to Figs. 1 and 2 showing the juxtaposed units rotated to a third position so that a white background is shown;

Fig. 4 is a longitudinal section taken through one of the juxtaposed rotating units shown in Figs. 1 to 3 inclusive, certain details of the rotating mechanism therefor being also shown in longitudinal section;

Fig. 5 is a view taken substantially along the line 5—5 of Fig. 4 of one of the rotating intelligence carrying units, showing details of the locking mechanism for locking the rotating unit in any of the three 120° apart positions;

Fig. 6 is a partial end view of the rotating solenoid shown in Fig. 4, showing details of a construction of a return spring for returning the solenoid to an initial position;

Fig. 7 is a view taken on the line 7—7 of Fig. 4 showing details of an unlocking finger for unlocking a locking member normally holding the rotating unit in position, the finger being shown at the start of the unlocking operation;

Fig. 8 is a view taken on the line 8—8 of Fig. 4 showing the locking member in the released position for turning movement of the rotating unit;

Fig. 9 is a view similar to Fig. 7, but showing the position of the unlocking mechanism when the lock is in the position as shown in Fig. 8;

Fig. 10 is a view similar to Fig. 8 showing the rotation of the locking cam and the contact of the locking member therewith between two adjacent locking positions of the locking mechanism;

Fig. 11 is a view similar to Fig. 9 and showing the travel of the unlocking finger past the locking member, while the locking member is in a position corresponding to that shown in Fig. 10;

Fig. 12 is a plan view of a portion of the locking mechanism shown in Fig. 4, showing certain details of construction of the clutch cooperating with the locking mechanism;

Fig. 13 is a view similar to Fig. 12 showing the position of the clutch for turning of the rotatable unit when the locking mechanism is in the unlocked position; and Fig. 14 is a schematic isometric view of the switches for controlling the operation of the several juxtaposed units and the rotating solenoids associated with each.

Referring particularly to Figs. 1 to 3 of the drawings, the invention is shown as embodied in a display advertising board 20 of a generally rectangular shape and including a frame 21 supported on legs 22. The display board 20 presents a display surface 23 composed of juxtaposed rotating intelligence carrying units 24, which are rotatable as desired in accordance with an animation effect to be desired. As shown in Fig. 1, there are fifteen such rotatable sign units arranged in side by side relationship. However, it is contemplated that the display board 20 consist of five panels each having fifteen rotatable units therein. For the purpose of simplicity of explanation of the invention herein, the display board 20 may be considered as having three such panels each comprising five such rotatable units.

As seen in Fig. 5, each rotatable unit 24 has an aquilateral triangular shaped cross-section, and has sides 26, 27 and 28. The unit 24 is adapted to turn upon an axis, as will be described in more detail and under conditions as will be described later in this specification, so that the sides 26, 27, and 28 will be displayed in desired sequence. As shown in Fig. 1, the sides 26 may thus be painted or otherwise provided with suitable intelligence thereon so that the name of a nationally advertised product will be spelled out, for example, in black letters upon a white background. Each unit 24 is adapted to turn upon its axis of rotation so that the side 27 may be displayed as shown in Fig. 2, so that the name of the product, for example, may be displayed in white letters upon a red or other colored background. As seen in Fig. 3, the units 24 may be rotated about their individual axes to still another position, so that the surface 28 may be displayed, which by way of example herein, is a plain white surface.

Referring now particularly to Figs. 4 and 5, the sides 26, 27 and 28 of the rotatable sign elements 24 are fastened at their ends to the sides of equilateral triangular shaped end plates 31 and 32. A trunnion 33 is mounted in any convenient fashion to the end plate 31 and a journal 34 extends therefrom and is supported for rotation in a thrust ball bearing 36 held in a bearing support 37 secured to a lower bracket or frame 38 as by the screw 39. The end closure plate 32 is likewise provided with a trunnion 41 held to the end closure plate 32 as by countersunk bolts 43 threaded into the end closure 32. The trunnion 41 has a journal or shaft 44 extending therefrom which is adapted to turn in a self aligning bearing 46 held in a bearing support 47 which in turn is held to an upper frame or support member 48 as by means of the countersunk screw 49 shown. The frame members 38 and 48 form a part of the frame structure of the advertising board 20 shown in Fig. 1, and the exact details of construction of the support frames 38 and 48 and of the frame 21 need not be specifically described as their shape and construction may be varied suitably to define a support for the rotatable units 24.

Each of the rotatable units 24 is adapted to be rotated in sequential steps spaced 120° apart so that the surfaces 26, 27, and 28 move into the extended plane of the display surface 23 in accordance with the intelligence desired to be displayed. Such sequential stepping movement of the units 24 is achieved by an intermittently operated rotary solenoid indicated generally by the reference numeral 50, and having a field structure 51 adapted to be energized to cause rotation of an armature 52 mounted on a shaft 53 supported in bearings 54 held by the field structure 51. A clock spring 55 connected to one end of the shaft 53 is anchored at 55a to the field structure 51 and serves to return the shaft 53 to a starting position when the field structure 51 is deenergized. The exact details of construction of such a rotary solenoid form no part of the invention herein, except that such a device may be included in the combination claimed herein, such details and construction of such a rotary solenoid being shown in more detail in Patent No. 2,337,375 and improvement patents thereunder.

However, such a rotary solenoid 50 may be of the type wherein the armature is adapted to rotate through an angle of approximately 180° while the field structure thereof is energized.

The rotary solenoid 50 and the shaft 53 thereof are connected to turn the shaft or journal 44 through the medium of a jaw clutch indicated generally by the reference numeral 56 and including a driving member 57 made fast to the shaft 53 by a pin 58. The jaw member 57 cooperates with a jaw member 59 having a sliding keyed connection to the shaft 44, there being a pair of flats 61 formed on opposite sides of the shaft 44. A spring 62 encircles the shaft 44 and is held between a rotating lock member 63 keyed to the shaft 44 by the flats 61 and bearing against a shoulder 64. One end of the spring 62 abuts the lock member 63 and the other end of the spring 62 abuts the sliding clutch member 59, the resiliency of the spring 62 tending to oppose slightly such over-riding movement of the clutch member 57 in the return movement thereof to the starting position of the armature 52.

Locking means are provided to prevent the unintended turning of the rotatable intelligence carrying unit 24 on its shafts 34 and 44, and to this end a locking arm 66 is pivoted at 67 to a locking arm support block 68 held to the support frame by a screw 69. A recess 71 in the locking arm support block 68 is provided with a pin 72 biased by a spring 73 tending to rotate the locking arm 66 in a clockwise direction as seen in Fig. 4 to cause the locking arm 66 to be engaged in one of three evenly spaced notches 74 formed in the locking member 63. As seen in Fig. 4, the end 76 of the locking arm 66 remote from its point of pivotable connection to the locking arm support block 68 is guided in a milled slot 77 formed in the bearing support 47, so that the locking arm 66 is held at each end to resist any tendency of the locking arm 66 to be twisted out of position as might be caused by unintended movement of the shaft 44 and the locking member 63.

The locking member 63 is in the form of a disc having the evenly spaced notches 74 theron, and the notches 74 are connected by circular cam surfaces 78 having centers which are eccentric of the center of the shaft 44, and so arranged that the locking arm 66 may ride on one of the eccentric cam surfaces 78 between the spaced notches 74 when the unit 24 is moving between the 120° apart spaced positions, see Figs. 8 and 10.

Mechanism is provided for releasing the locking arm 66 from engagement with the notch 74 when the rotary solenoid 50 is energized, and to this end the clutch member 57 is provided with an annular slot 79 for a locking arm release finger 81 which is connected by a pin 83 to the clutch member 57. As seen in Fig. 7, the locking arm release finger 81 bears against the bottom of the annular slot 79, and is so arranged that its point of pivotable connection to the clutch member 57 is offset with respect to a line coinciding with the longitudinal axis of the locking arm release finger 81 and the center of the shaft 53. The locking arm release finger 81 is provided with a rounded surface 84 at its inner end adjacent the connection thereof with the pin 83, so that the locking arm release finger 81 may rock in a counterclockwise direction with respect to the clutch member 57 as seen in Fig. 7, and so that the locking arm release finger 81 is incapable of rocking in a clockwise direction with respect to the clutch member 57. A torsion spring 86 is anchored at one end to the locking arm release finger 81 and encircles the pin 83, the other end thereof bearing against the outside of the clutch member 57. The spring 86 is of such a nature as normally to cause the locking arm release finger 81 to maintain the position as seen with respect to Fig. 7, and is so arranged, however, that the locking arm release finger 81 may rock in a counterclockwise direction with respect to the clutch member 57 under conditions as will now be described.

Since the solenoid 50 may be arranged to have approximately 180° of angular movement upon energization thereof, and since it is desired to effect only 120° of movement of the unit 24 upon each energization of the solenoid 50, the solenoid 50 and the locking arm release finger 81 are so arranged that the initial movement of the solenoid is such as to provide for angular travel of the armature 52 of the solenoid before the jaw clutch 57 engages the jaw clutch member 59, and so that the locking arm 66 is released from engagement from the notch 74 of the lock member 63. As seen with respect to Figs. 12 and 13, the initial movement of the armature 52 causes the jaw clutch member 57 to close a distance 87 between the jaw faces, and during such movement the locking arm release finger 81 is enabled to rock the locking arms 66 out of the notch 74. As seen also with reference to Figs. 7 and 8, such rotative movement of the clutch member 57 rocks the locking arm 66 against the force of the spring-biased plunger 72 so that the locking arm 66 is then out of engagement with the notch 74. When the jaw faces of the clutch member 57 and 59 contact each other, the rotating unit 24 is turned on its shaft 44 through 120° of angular travel, until the locking arm 66 is once more urged by the load in the spring 71 into the next notch 74, before which time the locking arm release finger 81 has moved past the locking arm 66, as seen in Fig. 11, until the extreme limit of travel has been reached by the armature 52 of the rotary solenoid 50. During such angular travel of the shaft 44, the latch 66 rides on the cam surface 78 until it is forced by the spring 71 into the next succeeding notch 74, see Fig. 10.

Upon deenergization of the rotary solenoid 50, the return spring 55 thereof, see also Fig. 6, causes the armature 52 thereof to return to the initial position until the solenoid is once more energized. In such return movement of the armature 52, the locking arm release finger 81 is enabled to move past the locking arm 66 which will be undisturbed in its position of engagement with the notch 74, since the locking arm release finger 81 may rock in a counterclockwise direction with respect to the clutch member 57, see Fig. 7. The load in the spring 71 is sufficient to overcome any tendency of the locking arm release finger 81 to move the locking arm 66 out of engagement with the notch 74 during the return movement thereof.

It will be understood that the rotating units 24 are arranged in side by side relationship, so that upon turning movement through 120° during energization of the solenoid 50, the surfaces of sides 26, 27 and 28 will be moved sequentially into position to form the display surface 23 of the display board 20 shown in Figs. 1 to 3 inclusive. In accordance with the animation effect desired, the solenoid 50 of each rotatable sign unit 24 is controlled by a master selector means referred to generally by the reference numeral 90, see Fig. 14. The selector means 90 includes a motor 91 which drives a drum shaft 92 through a speed reducer consisting of a worm 93 and a worm wheel 94. The drum shaft 92 provides a support for a plurality of drums 96 spaced therealong, there being a drum 96 for each of the rotary solenoids 50 and each of the units 24. Each drum 96 cooperates with a switch 97 having an actuator finger 98 thereon adapted to be actuated by raised pips 99 spaced along the periphery of each drum. Each switch 97 controls the energization of its associated rotary solenoid 50, and the frequency with which each solenoid 50 is energized is in accordance with the spacing of the raised pips along the periphery of the drum 96. For purposes of simplicity of the description herein, however, the rotating units 24 have been considered as being controlled in their movement so that the faces 26 thereof have been arranged to lie in the plane 23 to spell out the intelligence shown in Fig. 1, such intelligence being in the form of black letters upon a white background, and so arranged that the surfaces 27 may then be moved into the plane of the display surface 23 to spell the same letters in white upon a red background, and thereafter moved so that the surfaces 28 lie in the plane of the display surface 23 so that a blank white background is presented. However, the drum 96 may be so arranged that the units 24 may be selectively rotated so that the letters can be spelled out in sequence, and so that the display board 20 will, at the end of such sequence of movements of the rotatable units, be in the form as shown in Fig. 1.

It is contemplated also that the movement of the units may be such that letters appearing in white on a red background may be sequentially changed until the display board 20 is as seen in Fig. 2, the switches 97 being actuated by the drums 96 which are modified to achieve such an effect. It is intended also that the rotatable units be operated in an appropriate sequence to give any desired motion effect, and it is intended that the invention embrace all forms of a display board having such individually rotatable units which can be individually rotated to achieve such effects.

The exact form of the solenoid 50 for causing such individual rotation of the units 24 is no part of the invention except in the combination herein, and it is contemplated that the ordinary plunger type of solenoid may be employed using rack and pinion arrangements for causing rotation of the units 24. The exact form of the switching means is likewise no part of the invention and other forms of selector switches may be employed to achieve the results herein described.

While the invention is described in terms of a preferred embodiment which it may assume in practice, the scope of the invention is not intended to be limited by the precise form of the various elements disclosed herein, and it is intended that the scope of the invention be limited only by the claims here subjoined.

I claim:

1. In an intelligence bearing rotating unit for a display surface or the like, each of said intelligence bearing units having three non-coplanar sides spaced from the axis of rotation of said unit and being rotatable into a position of juxtaposition with respect to the sides of like units to form said display surface, each of said units comprising an individual intermittently operated motor for turning said unit to a selected position, said motor having an armature adapted to be rotated through a limited angle substantially equal to 120°, a lock for locking said unit in a preselected position, means for releasing said lock upon the initial operation of said motor so that said unit may be rotated by said motor to a preselected position, and means for controlling said motor selectively in accordance with the desired intelligence to be displayed.

2. In an intelligence bearing rotating unit for a display surface or the like, each of said intelligence bearing units having three non-coplanar sides spaced from the axis of rotation of said unit and being rotatable into a position of juxtaposition with respect to the sides of like units to form said display surface, each of said units comprising an individual intermittently operated motor for turning each of said units to a selected position, said motor having an armature adapted to be rotated through a limited angle substantially equal to 120°, a clutch connecting said rotatable unit with said motor, a lock for locking said rotatable unit in a preselected position, means operable during the initial clutching operation of said clutch for releasing said lock upon operation of said motor in turning said unit to a preselected position, said lock releasing means being inoperable during the movement of said motor to a start position whereby said lock is effective to hold said unit in a preselected position.

3. In an intelligence bearing rotating unit for a display surface or the like, each of said intelligence bearing units having three non-coplanar sides spaced from the axis of rotation of said unit and being rotatable into a position of juxtaposition with respect to the sides of like units to form said display surface, each of said units comprising an individually intermittent operated motor for turning said unit to a selected position, said motor having an armature adapted to be rotated through an angle of at least 120°, a clutch connecting said rotatable unit with said motor, a lock for locking said rotatable unit in a preselected position, means operable during the initial clutching operation of said clutch for releasing said lock upon operation of said motor in turning said unit to a preselected position, said lock releasing means being inoperable during the return movement of said motor to start position whereby said lock is effective to hold said unit in a preselected position, and means for controlling said motor selectively in accordance with the intelligence to be displayed.

4. In an intelligence bearing rotating unit for a display surface or the like, each of said intelligence bearing units having three non-coplanar sides spaced from the axis of rotation of said unit and being rotatable into a position of juxtaposition with respect to the sides of like units to form said display surface, each of said units comprising an individual intermittently operated rotary solenoid having an armature rotatable through an angle of at least 120°, a clutch connecting said unit to said rotary solenoid for rotation of said unit through an angle of approximately 120°, a lock for locking said unit in position spaced by angles of approximately 120°, means for releasing said lock when said solenoid is energized so that said unit may be turned through said angle, and means urging said lock into locking position for holding said unit in position after turning through said angle.

5. The invention as defined in claim 4 wherein said solenoid is provided with an armature which overrides said clutch in returning to its initial position while said unit is held in position by said lock.

6. The invention as defined in claim 5 wherein said lock is held in locked position upon return of said rotary solenoid to an initial position, and said lock releasing means moves past said lock upon such return movement of said solenoid whilst the lock is held in locked position.

References Cited in the file of this patent

UNITED STATES PATENTS

| | | |
|---|---|---|
| 760,242 | Perry | May 17, 1904 |
| 1,126,374 | Breth | Jan. 26, 1915 |
| 1,784,365 | Von der Lippe-Lipski | Dec. 9, 1930 |
| 1,797,773 | Hoban | Mar. 24, 1931 |
| 1,923,523 | Whitney | Aug. 22, 1933 |
| 2,277,323 | Hjermstad | Mar. 24, 1942 |
| 2,337,375 | Cramer | Dec. 21, 1943 |
| 2,389,487 | Cramer | Nov. 20, 1945 |
| 2,530,795 | Unk | Nov. 21, 1950 |
| 2,616,299 | Unk | Nov. 4, 1952 |
| 2,603,329 | Worthen | July 15, 1952 |